Patented Nov. 20, 1945

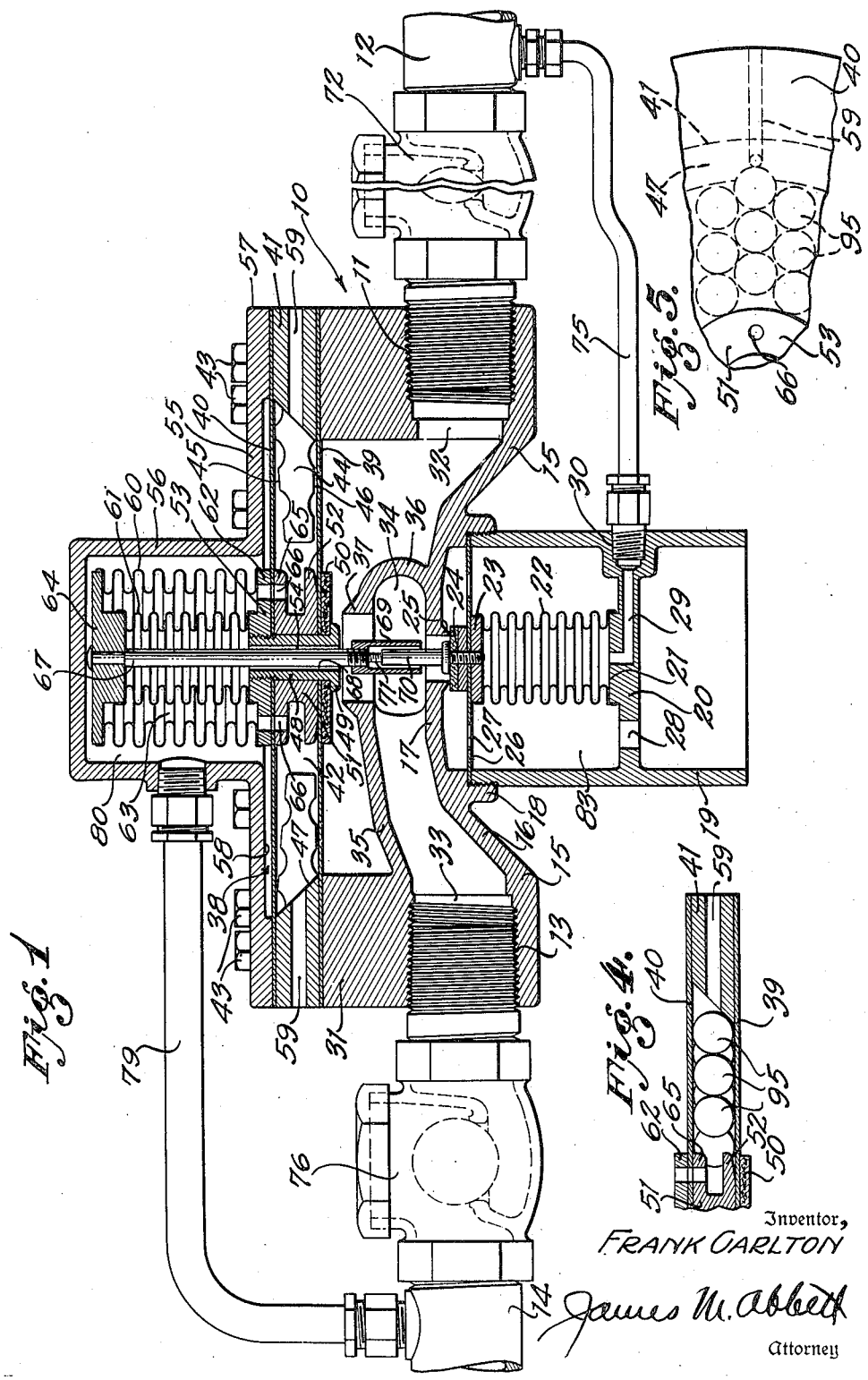

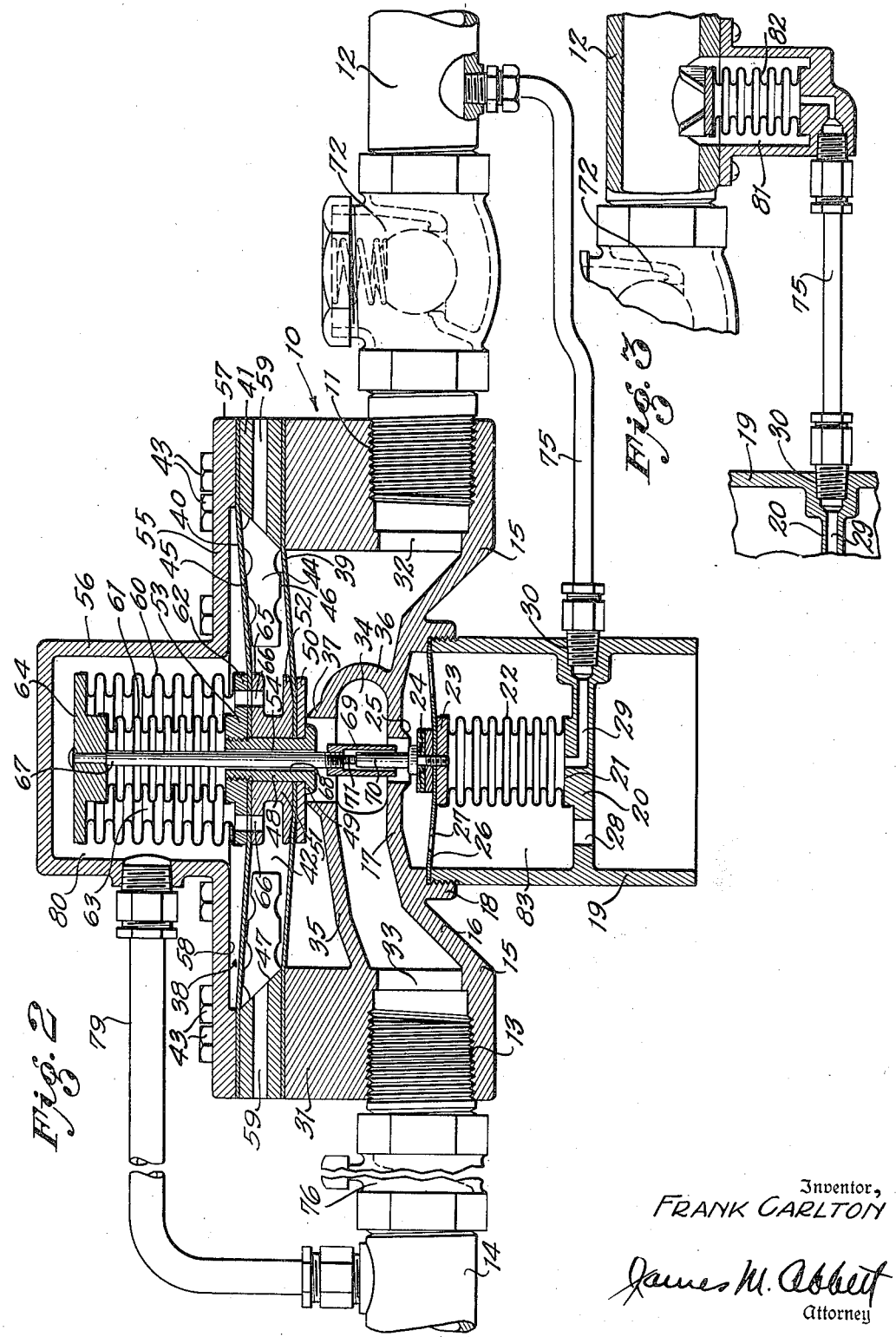

2,389,412

UNITED STATES PATENT OFFICE 2,389,412

ANTIBACKFLOW AND ANTISIPHONAGE VALVE

Frank Carlton, Los Angeles, Calif.

Application September 26, 1941, Serial No. 412,372

13 Claims. (Cl. 277—1)

This invention relates to liquid flow systems and particularly pertains to an anti-backflow and anti-siphonage valve.

In connection with liquid flow systems, such for example as those in which water is delivered from a water main through a connecting service pipe to the domestic lines of a building, or in cases where water is delivered in the same manner to equipment in an industrial plant or to any private or domestic piping system or fixtures or equipment thereon, occasions sometimes arise when the water pressure in the supply line and the water pressure in the domestic piping system become unbalanced so that a major pressure occurs in the domestic piping system. Under such conditions a backflow action will be created flowing reversely from the domestic service lines to the supply line with the result that this water, now considered used as well as polluted, contaminated, or containing deleterious matter, may be drawn into the domestic piping system, through the service line and into the water mains, and thus contaminate the pure water supply. Heretofore, various structures have been produced in an attempt to interrupt the backflow, and thus the back-siphonage of water from the domestic service line into the supply line, or to interrupt or prevent back-siphonage from water served fixtures, devices, containers, receptacles or equipment into the domestic piping system, or to interrupt and make impossible backflow communication between dual interconnected supply systems at points of cross-connection where said systems contain water from different sources or where one supply system, often called the secondary, is not under proper sanitary supervision. These have in certain instances proved objectionable due to the fact that a leakage at or through the structure or device of the back flowing water can occur without detection. This might be brought about by the failure of valves to seat, or by the fact that certain parts might become damaged or barrier walls ruptured within the valve structure itself. It is the principal object of the present invention, therefore, to provide automatic means which will act to interrupt the backflow and back-siphonage of water from the domestic service lines to the supply line or between water served fixtures, devices, containers, receptacles or equipment and the domestic or supply piping system, or between interconnected supply systems of different origin, or between any parts or areas of either supply lines or domestic service lines as may be desired, and in addition thereto to provide a chamber which is interposed between said desired points therein at a time when either a back-siphonage or backflow condition exists, whereby a reverse flow of water will be interrupted by said chamber and be expelled to atmosphere, and thus have no opportunity to reach or enter any part or parts of the piping system that said device has been interposed to prevent.

It is another object of the present invention to so construct certain vital parts, whose purpose is to impose a moving water-tight barrier between fluids having either variable pressure differentials or being static or non-moving, whereby a rupture or leakage of any of said barrier parts will be discernible on the outside of the valve housing, thus indicating need of repair or replacement of parts, and so providing for the first time in a device of this sort a constant externally visible alarm against breakage or functional failure of internally operating mechanisms or parts.

The present invention contemplates the provision of a valve structure having a main housing, an induction passageway connected to a supply line, an eduction passageway connected to a service line, an interposed chamber through which said passageways may communicate and which chamber may be opened directly to atmosphere while creating an air chamber completely severing all fluid communication between the induction and eduction passageways, the structure including valves responsive in different ways so that when a backflow condition is approached there will be created an interposed air chamber between said induction and eduction passageways.

In this specification the terms supply line and service line are used. It is to be understood that these terms apply to any induction and eduction connections.

The invention is illustrated by way of example in the accompanying drawings in which:

Figure 1 is a view in central vertical section through one form of the invention with the parts in the relationship which will exist when the fluid flow is normally passing from the supply main, through the connecting service line, through the device, and into the private piping system for which it is intended.

Fig. 2 is a view in central vertical section similar to Fig. 1 showing the relation of parts of the device when a backflow condition exists.

Fig. 3 is a fragmentary view in section and elevation showing a means of utilizing a sealed unit filled with oil or the like, transmitting pressure differentials between the supply line and the proper part of the valve chamber.

Fig. 4 is a fragmentary view in vertical section showing another form of multiple diaphragm.

Fig. 5 is a fragmentary view in plan showing the form of diaphragm disclosed in Fig. 4 and indicating the manner in which the diaphragms are maintained separate.

Referring more particularly to the drawings, 10 indicates the main housing of the valve with which the present invention is concerned. This housing is formed with a threaded opening 11 to receive the end of a supply pipe 12. Upon the diametrically opposite side of the housing 10 is a threaded opening 13 receiving the domestic service pipe 14. A bottom wall 15 extends from the side of the housing within which the opening 11 is formed to the side of the housing within which the opening 13 is formed. This wall extends upwardly and provides a frusto-conical wall section 16, the top of which carries a horizontal wall section 17. Extending downwardly from the wall 15 is a cylindrical flange 18. The flange 18 is internally threaded and receives a downwardly extending cylindrical housing 19. This cylindrical member is provided to conduct the discharge water from the valve housing and to act as a conduit from the valve housing to the atmosphere, as will be hereinafter explained. A transverse wall 20 extends across the cylindrical member 19 at a point in its height. This wall is formed with a central seat 21 to which a Sylphon bellows 22 is secured. A disc 23 is secured to the upper end of the Sylphon bellows 22 and carries a valve element 24. This element normally rests against a valve seat 25 formed centrally of the portion 17 of the lower wall 15 of the main valve housing. A perforated diaphragm 26 is secured across the upper end of the cylindrical housing member 19 and to the valve 24 and its disc 23. This tends to stabilize the valve in its movement. Openings 27 are formed through it. Openings 28 are formed through the transverse partition 20 of the member 19 to permit a free flow of air and water therethrough. A conduit 29 is formed within the transverse partition 20 and leads to the interior of the Sylphon bellows 22. The opposite end of this conduit leads to a threaded opening 30 in the wall of the member 19 for a purpose to be hereinafter described.

The main valve housing 10 is formed with a concentrically arranged cylindrical wall 31 which extends upwardly from above an inlet port 32 at one end of the housing and an outlet port 33 at the opposite side of the housing. The outlet port connects with an outlet chamber 34 which is concentric with the central axis of the valve housing and the valve seat 25. This outlet port is defined by the bottom wall 15 and an upper partition wall 35 while the outlet chamber is defined by a substantially circular wall section 36 which is arcuate in vertical section. At the top of the chamber 34 is a valve seat 37. This valve seat is concentrically disposed with relation to the valve seat 25 and is spaced thereabove. The diameter of the opening through the valve seat 37 is materially greater than the diameter of the opening through the valve seat 25, since the normal flow of water from the supply line to the service line takes place through the opening in the valve seat 37 and the discharge water from the domestic line only flows through the opening in the valve seat 25.

Mounted over the top of the main valve housing 10 and extending across the central opening formed by the wall 31 within that housing is a multiple diaphragm structure 38. This comprises a lower diaphragm 39 and an upper diaphragm 40 spaced therefrom. A ring-shaped casting 41 is disposed between these diaphragms and holds them in spaced relation to each other to provide an intermediate chamber 42. The ring-shaped casting is secured in position by suitable bolts 43 and is formed with a plurality of radially disposed ribs 44 which have spacing faces 45 and 46 to prevent the collapse of the diaphragms into the chamber 42. Attention is directed to the fact that the inner circumferential wall 47 of the ring 41 is inclined inwardly and downwardly to a diameter substantially agreeing with the diameter of the wall 31. This causes the diaphragms 39 and 40 to be of different diameters so that a greater pressure area will be provided on the upper diaphragm 40 than is provided on the lower diaphragm 39. The object of forming the two diaphragms 39 and 40 with differential areas is to provide a regulator action, whereby the main flow valve 50 automatically closes and shuts off normal flow between induction and eduction lines when the eduction pressure rises to a predetermined magnitude below the induction pressure, it being understood that normally the prevailing pressure in the eduction line is always a predetermined amount less than the pressure in the induction line. This condition prevails regardless of the pressure occurring in the induction line, which pressure may vary. The two diaphragms have centrally aligned openings through them to receive the cylindrical body of a guide and clamping member 48. The lower end of this guide and clamping member has an enlarged head 49 which forms a shoulder for a main flow valve disc 50. The valve disc 50 is thus secured by the head against the lower face of the diaphragm 39. The diameter of the head is such as to insure that it may pass into the opening of the valve seat 37 and to bring the valve disc 50 to rest against the upwardly presented lip of the valve seat 37.

A spacing member 51 is mounted upon the cylindrical portion of the member 48 and is disposed between the diaphragms 39 and 40. This spacing member has an enlarged disc portion 52 at its lower end which is formed with a lower convexed face resting against the upper face of the diaphragm 39 and tending to reinforce the center of the diaphragm 39 and to coact in holding the valve disc 50 in position. The upper end of the cylindrical portion of the member 48 is externally threaded to receive a clamping nut 53. Formed centrally through the member 48 is a fluid passageway 54 which is provided for a purpose to be hereinafter explained.

The clamping bolts 43 engage a cover member 55 which has a central cylindrical wall 56 and a relatively large disc-shaped flange 57. The lower face of the flange is relieved at 58 to provide clearance for the upper diaphragm 40. The edge portion of the flange which agrees with the surface of the upper face of the spacing ring 41 directly abuts against the diaphragm 40 to hold it in place. Thus, the edges of the diaphragms are sealed with the spacing ring 41 interposed between them. Drain openings 59 extend radially through the ring 41 and establish communication between the chamber 42 and the atmosphere. The cylindrical portion of the cover 55 extends vertically and is concentric with the central axis of the valve seats 25 and 37.

Mounted within the cylindrical portion 56 of the cover are a pair of concentrically arranged Sylphon bellows 60 and 61. The bellows 60 is of relatively large diameter and is secured at its lower end to a flange 62 of the nut 53. The bellows 61 is disposed within the bellows 60 and in spaced relation thereto to form an annular space 63. The lower end of the bellows 61 is secured to the nut 53. The upper ends of both the bellows 60 and the bellows 61 are secured to a closure disc 64. The flange 62 of the nut 53 and a corresponding flange 65 of the spacer 51 are formed with passageways 66 which establish communication between the space 63 and the space 42. It will thus be seen that a compound bellows and diaphragm structure is provided which, if ruptured, would cause a leakage of liquid through the ducts 59 to the atmosphere. This would visually indicate a failure of the structure within the valve.

Carried by the disc 64 is a tappet stem 67 which is rigid with the disc 64 and extends downwardly through a central opening 68 in the guide and clamping member 48. The lower end of the tappet 67 carries a sleeve 69 into which the stem 70 of the relief valve 24 extends. The tappet rod 67 is intended to strike against the upper end of the stem 70 and to move the valve 24 away from its seat 25. An adjusting screw 71 is threaded into the end of rod 67 to compensate for variable lengths of the bellows 22, 60 and 61.

The supply line conduit 12 is fitted with a check valve 72 through which the water flows into the valve housing 10. The valve 72 is mounted on the inflow side of the chamber member 10. Any other type of valve may be used. The check valve 72 is spring or weight loaded in order to create a pressure differential to thus cause water flowing into chamber 10 to bypass through a tube 75 to interior of bellows 22 thereby closing bleeder valve 24 in preparation for the normal flow of water through the structure.

Mounted within the service line conduit 14 at a point beyond the housing 10 is a check valve 76. This valve 76 will obstruct the backflow of water from the service line 14 into the valve housing when closed. At a point on the service line side of the valve 76 is a tube 79 which establishes communication between the conduit 14 and the chamber 80 which occurs in the portion 56 of the housing cover 55, and within which chamber the Sylphon bellows 60 and 61 are positioned. Attention is directed to the fact that the tubes 75 and 79 are both unobstructed, the first named tube being in constant communication with the supply conduit 12 and the last named tube being in constant communication with the service conduit 14. It is also to be noted that the tube 79 is of relatively large diameter to permit unrestricted flow of liquid from the service line 14 to the chamber 80 when the valve 76 is closed due to back pressure in the service lines or a static pressure throughout the device.

Referring to Fig. 3 of the drawings, it will be seen that the tube 75 has been modified in its construction so that there will not be any passage of water from the supply line 12 to the conduit 29, thus insuring the tube 75 will not become clogged. Mounted within the chamber 81 is a Sylphon bellows 82 directly connected with the tube 75. The Sylphon bellows, the tube 75, the conduit 29 and the Sylphon bellows 22 are all filled with an incompressible fluid, such for example as oil. Thus, compression of the bellows 82 will impart an equal expanding force to the bellows 22 and vice versa.

Referring to Figs. 4 and 5, another form of multiple diaphragm structure is shown. In this case the spacer 49 is disposed between the diaphragms 39 and 40, at which time they are held preferably in closer relation to each other than shown in Figs. 1 and 2. In order to space the diaphragm so that they will move in unison when flexed, a plurality of balls 95 are placed between the diaphragms 39 and 40. These balls may be steel or rubber balls, such as are used in antifriction bearings, and are of a diameter agreeing with the space between the diaphragms. If desired, an intermediate rubber web may be used. By this arrangement it will be seen that the diaphragms will be held in spaced relation to each other while they flex, and at the same time fluid may pass between and around the balls 95 so that a leak may be indicated. Attention is also directed to the fact that the size and number of balls may be selected to impose a desired weight upon the diaphragm 39 and to thus tend to urge the valve disc 50 onto its seat 37. The advantage resulting from thus weighting or loading the valve 50 is found when the pressure within the chamber member 10 is insufficient to provide the desired pressure reduction. The weight thus provided will maintain the valve 50 seated until the induction pressure rises sufficiently to again open the said valve 50. This insures even under very low pressure conditions that the valve 50 will seat to prevent backflow and to permit the operation of the relief valve as hereinafter set forth. The use of the balls 95 for spacing elements will also insure that the diaphragms 39 and 40 may flex throughout their free area without restriction from spacing means such as the webs 44. This will cause free and uniform movement to take place under the influence of fluid pressure exerted against the diaphragms.

In operation of the present invention water is delivered through the supply pipe 12. For the purpose of this description it will be assumed that the normal pressure of water in the supply line is 60 pounds gauge pressure. As the water flows through the conduit 12 into the passageway 32 of the housing 10 it will force the check valve 72 open. At the same time the pressure exerted by the water in the supply line will act through the tube 75 and the conduit 29 to fill the Sylphon bellows 22 and exert a pressure on the disc 23, tending to force the relief valve 24 upwardly against its seat 25 and thus prevent the discharge of water from chamber 34 through the valve seat 25 and into the chamber 83 of the cylinder 19. The water which is delivered through the supply pipe 12 will act against the under face of the diaphragm 39 and will force this diaphragm upwardly while lifting the valve disc 50 from the valve seat 37. The water may then pass into the chamber 34 through the central opening in the valve seat 37 and may then flow through the passageway 33 into the service conduit 14. When the service line 14 is filled the tube 79 will also be filled. Water from this tube will flow into the chamber 80 around the Sylphon bellows 60 and will exert a pressure against this bellows and the top of closure plug 64 as well as against the upper face of the diaphragm 40. As previously mentioned, the diaphragms 39 and 40 have been designed to have differential pressure areas so that a regulator action will be provided whereby the main flow valve automatically moves toward a closing position to establish a predetermined reduction in pressure between the induction pressure and the eduction pressure, or moves to a closed position and shuts off normal flow between the induction and eduction lines when the eduction pressure rises to a predetermined amount below the induction pressure.

Attention is directed to the fact that the gauge pressure occurring between the diaphragms 39 and 40 and between the walls of the Sylphon bellows 60 and 61 under normal conditions stands at zero, since the spaces 42 and 63 are in constant communication with the atmosphere. It will therefore be evident that in event either the diaphragm 39 or 40 leaks, or the Sylphon bellows 60 or 61 leaks, that this leakage water will flow out through the passageway 59 and give visual indication of structural failure of the apparatus.

An important and vital result achieved by the dual bellows 60 and 61 and the parallel diaphragms 39 and 40 aside from the visual evidence of leakage, which is obtained, as compared with a device including a single bellows and diaphragm, is that in the latter event direct communication would be established through the device, whereby contaminated or polluted water would flow into the supply stream. This flow would be established through the tube 79 to the chamber 80, then through the ruptured diaphragm or bellows into the valve housing, and then into the supply pipe 12. It will be evident that nothing of this kind can take place with the dual construction.

In the operation of the device here described, it is desirable to maintain a predetermined lesser pressure in the eduction line 14 than in the induction line 12. This is desirable in order to insure that the bleeder valve 24 will remain closed during normal flow but will be opened before a superior pressure exists in the eduction line. This is accomplished by operation of the main valve, which functions as a differential pressure regulator, since it is moved by diaphragms 39 and 40. These diaphragms have different pressure areas, the larger being exposed to eduction pressure.

When water is no longer withdrawn from the eduction line 14, the eduction pressure will consequently rise. This increase in eduction pressure will then be imposed through tube 79 upon the larger area presented by the upper face of the diaphragm 40. This will cause the main valve 50 to close while the pressure on the eduction line is still a predetermined amount below the pressure then existing in the induction line.

It will be understood that on the discharge side of the main valve 50 is the bleeder valve 24, which opens under a backflow condition and relieves the pressure in the outlet chamber 34 by discharging such quantity of water through the valve 24 from the eduction side of the system as is necessary to prevent the pressure in the chamber 34 from rising above the induction pressure. This bleeder valve 24 is responsive to service line pressure on one side and to an opposing combination of eduction pressures exerted through tube 79 and chamber 80, and also exerted by the fluid in pressure chamber 34 against the bleeder valve disc 24. Under normal conditions, or when normal flow ceases, the bleeder valve 24 remains in a closed position. However, the effective areas of the bleeder valve structure exposed to the opposing pressures of eduction and induction fluids are so proportioned that if the induction pressure falls or the eduction pressure rises until a backflow condition is approached, the bleeder valve 24 opens sufficiently to reduce the pressure in the outlet chamber. If the eduction pressure continues to rise, the pressure in the outlet chamber 34 will continue to fall, and finally will reach zero when the eduction pressure has become equal to the induction pressure. Consequently, the pressure in the outlet chamber 34 will then be at zero. If the eduction pressure should rise above that of the induction pressure, this same condition would exist.

Attention is directed to the fact that in the event check valve 76 leaks while the valve 24 is opened the leakage would drain through valve seat 25.

When the fluid pressure in the supply line 12 is restored and becomes sufficiently greater than that in the service line 14 and the chamber 34 the check valve 72 will move to an open position and will allow the liquid to pass into the valve housing 10 and to act against the lower face of the diaphragm 39. At the same time the pressure of the liquid within the supply line 12 will be transmitted through the tube 75 to the Sylphon bellows 22 and will force the relief valve 24 upwardly onto its seat. Attention is directed to the fact that since the valve 72 is either spring or weight loaded there will be a tendency for it to remain seated while an advance flow of fluid passes through the tube 75 and the duct 29 to the Sylphon bellows 22. This will insure that the valve 24 is seated in advance of the time the water from the supply line reaches it. Thus there will not be a tendency for wastage of water before the valve 24 closes. When the valve 24 closes, a flow conduit will be established through the valve housing 10 and the passageway 33 to the service line 14. The check valve 76 will then be opened so that the pressure throughout the system will be restored to a normal operating condition.

It will thus be seen that by the arrangement here disclosed a structure is provided which may be interposed between a fluid supply line and a service line of any character, and which will act automatically when a backflow condition exists to establish a complete air gap between the two lines while permitting any water leaking from the service line side to drain to atmosphere. It is also to be noted that due to the structural arrangement of the parts of the valve the leakage of any of the valve diaphragms or bellows will be indicated directly irrespective of the flow condition in the lines and the pressure values of the liquid in the service line and the supply line.

While I have shown the preferred method of preventing backflow and back-siphonage of fluid from a domestic service line to a supply line and apparatus for carrying out the method, it will be understood that various changes may be made in the steps of the method and the combination, construction and arrangement of parts of the apparatus by those skilled in the art without departing from the spirit of the invention as claimed.

Having thus described my invention, what I claim and desire to secure by Letters Patent is:

1. An anti-backflow device adapted to be interposed between an induction line and an eduction line within both of which variable fluid pressure prevails, an intermediate partition in said device having a valve opening therethrough and through which fluid may flow from the induction line to the eduction line, a main valve element for closing said opening, a check valve in the eduction line opening in the direction of normal flow. fluid pressure responsive means associated with the main valve for moving the same, the induction fluid pressure acting thereon to open the main valve, and a conduit connecting with the eduction line at a point beyond the check valve and delivering eduction fluid to the fluid pressure responsive means to exert a pressure opposing that of the induction fluid and acting to urge the main valve toward a closed position, the fluid pressure responsive means including differential pressure responsive areas acted upon by the induction and eduction fluids, whereby the main valve will close when the eduction pressure rises to a predetermined amount below the induction pressure.

2. A valve structure of the character described, comprising a valve housing having a fluid passageway therethrough, a partition in said passageway, a valve opening through said partition, a movable partition valve element for closing said opening, an induction passageway at one side of said partition, an eduction passageway at the opposite side of said partition, a check valve disposed in the eduction passageway and opening in the direction of flow of fluid from the induction passageway to the eduction passageway, an opening in the wall of the valve housing on the eduction side of the partition and between the partition valve and the eduction check valve, a relief valve for closing said opening, a fluid pressure responsive element acted upon by induction fluid from in advance of the partition valve tending to maintain the partition valve open, fluid responsive means responsive to fluid pressure derived from the induction fluid line in advance of the partition valve tending to maintain the relief valve closed, fluid responsive means deriving pressure from the fluid beyond the check valve in the eduction line tending to maintain the partition valve closed, and fluid responsive means derived from pressure of fluid in the eduction line tending to maintain the relief valve open, the pressure areas of the responsive means exposed to eduction pressures being greater than the pressure areas exposed to induction pressures.

3. An anti-backflow device adapted to be interposed between an induction line and an eduction line within both of which lines variable fluid pressures prevail, an intermediate partition within said device having a valve opening therethrough and through which fluid may flow from the induction line to the eduction line, a main valve element for closing said opening, a check valve in the eduction line opening in the direction of normal flow, an outlet to atmosphere in the eduction line at a point between the main valve and the check valve, a bleeder valve normally closing the outlet, fluid pressure responsive means including separate fluid pressure elements associated with the main valve and the bleeder valve and acting to open and close said valves independently of each other, the said fluid pressure responsive elements presenting differential fluid pressure responsive areas, the greater of which areas is subjected to the eduction pressure tending to close the main valve whenever the eduction pressure approaches the induction pressure and providing differential areas acting to actuate the bleeder valve, the said differential areas being so proportioned as to actuate the relief valve to open position after the main valve closes and before the eduction pressure equals the induction pressure, a conduit connecting with the eduction line at a point beyond its check valve and delivering fluid pressure to the fluid pressure responsive means of the main valve and the bleeder valve acting to urge the main valve toward a closed position and the bleeder valve toward an open position.

4. The structure as defined in claim 3 wherein the fluid pressure responsive means for the main valve includes two opposed fluid pressure responsive elements and the fluid pressure responsive means for the bleeder valve includes two fluid pressure responsive elements.

5. An anti-backflow device adapted to be interposed between an induction line and an eduction line within both of which variable fluid pressures prevail, an intermediate partition within said device having a valve opening therethrough and through which fluid may flow from the induction line to the eduction line, a main valve element for closing said opening, a check valve in the eduction line opening in the direction of normal flow, an outlet to atmosphere in the eduction line at a point between the main valve and the check valve, a bleeder valve normally closing the outlet, fluid pressure responsive means for the main valve and fluid pressure responsive means for the bleeder valve, a conduit connecting with the eduction line at a point beyond its check valve and delivering eduction fluid to the fluid pressure responsive means of the main valve and the bleeder valve acting to urge the main valve toward a closed position and the bleeder valve toward an open position, the fluid pressure responsive means of the main valve and the fluid pressure responsive means of the bleeder valve comprising elements so proportioned that the main valve closes when the eduction pressure rises to a predetermined amount below the induction pressure and the bleeder valve opens after the main valve closes and before the eduction pressure equals the induction pressure.

6. A backflow prevention device for use in a fluid distributing system having an induction and an eduction line through which fluid flows under pressure, means for producing and maintaining during normal flow a substantial pressure drop between induction and eduction pressures, a vent valve, means for actuating said valve including biasing means for said valve comprising pressure responsive means subject to the induction and eduction pressures and so constructed and arranged that when the induction and eduction pressures are equal, said pressure responsive means is biased in an opening direction, and when the normal pressure drop is maintained, said bias is overcome by the pressure differential acting on said pressure responsive means and the valve is maintained closed, whereby the vent valve will operate to vent the device between the induction and eduction lines when the eduction pressure is less than the induction pressure by an amount less than the pressure drop.

7. A backflow prevention device for use in a water distributing system having an induction and an eduction line through which fluid flows under pressure, pressure responsive means for producing and maintaining during normal flow a substantial pressure drop between induction and eduction pressures, a vent valve, means operatively connected between the induction and eduction lines including biasing means for said valve comprising pressure responsive means subject to the induction and eduction pressures and so constructed and arranged that when the induction and eduction pressures are equal said valve is biased in an opening direction and when the normal pressure drop is maintained, said bias is overcome by the pressure differential acting upon the pressure responsive means and the valve is maintained closed whereby the vent valve will operate to drain the device between the induction and eduction lines when the eduction pressure is less than the induction pressure by an amount less than the pressure drop.

8. In a device for preventing backflow in a water distributing system from an induction line to an eduction line, the combination of a valve member opening in the direction of water flow from the induction line to the eduction line, said valve member including means for producing and maintaining during normal flow a substantial pressure drop between the induction line pressure and the eduction line pressure to form a reduced pressure zone, a valve for venting the zone to the atmosphere, said vent valve including biasing means comprising pressure responsive means subject to the induction and eduction pressures and so constructed and arranged that when the induction and eduction pressures are equal, said valve is biased in an opening direction, and when the normal pressure drop is maintained, said bias is overcome by the pressure differential acting on said pressure responsive means and the valve is maintained closed.

9. In a backflow prevention device for a water distributing system having an induction line and an eduction line, a flow valve between the lines, means subject to induction and eduction pressures upon opposite sides of the flow valve for producing a differential and substantial pressure drop during normal flow and at cessation of normal flow, a vent valve, biasing means for the vent valve, including means subject to induction and eduction pressures and so constructed and arranged that said vent valve is biased in a closing direction during normal flow and at cessation of normal flow, and is biased in an opening direction when the eduction pressure is less than the induction pressure by an amount less than the pressure drop determined by the first stated means.

10. The combination defined in claim 7 wherein the pressure responsive means for producing the pressure drop comprises a differential area valve subject to induction and eduction line pressures.

11. The combination of claim 6 in which the means providing for the pressure drop is spring biased.

12. In combination in a water distribution system having an induction line and an eduction line, of a chamber member between the said lines, means for providing a substantial pressure drop in the chamber member, a vent valve, means subject to both induction and eduction pressures for holding said vent valve in closed position when the pressure drop in the chamber is maintained and operating upon the change of pressure influence thereon to open said vent valve when the eduction pressure is less than the induction pressure by an amount less than the pressure drop.

13. In a backflow prevention device, the combination of a chamber device, an induction line leading to the chamber device, an eduction line leading from the chamber device where water normally flows from the induction line through the chamber device and out the eduction line, means operative during normal flow and at cessation of normal flow to produce a substantial pressure drop between the induction and eduction pressures, a vent valve operative to vent the chamber device, means for actuating said valve including biasing means for said valve comprising pressure responsive means subject to induction and eduction pressures, and so constructed and arranged that when the induction and eduction pressures are equal, said valve is biased in an opening direction and when the normal pressure drop is maintained, said bias is overcome by the pressure differential acting on the said pressure responsive means and the valve is maintained closed.

FRANK CARLTON.